United States Patent
Reynolds, Jr. et al.

(10) Patent No.: US 6,782,932 B1
(45) Date of Patent: Aug. 31, 2004

(54) APPARATUS AND METHOD FOR MAKING WOUND-FIBER REINFORCED ARTICLES

(75) Inventors: Harris A. Reynolds, Jr., Houston, TX (US); Chris A. Lundberg, Kingwood, TX (US); Joel D. Shaw, Houston, TX (US); Thomas J. Walsh, Houston, TX (US)

(73) Assignee: Hydril Company L.P., Houston, TX (US)

( * ) Notice: Subject to any disclaimer, the term of this patent is extended or adjusted under 35 U.S.C. 154(b) by 195 days.

(21) Appl. No.: 09/664,041

(22) Filed: Sep. 18, 2000

Related U.S. Application Data
(60) Provisional application No. 60/160,614, filed on Oct. 20, 1999.

(51) Int. Cl.$^7$ ............................................. B32B 31/00
(52) U.S. Cl. ...................... 156/351; 156/360; 156/361
(58) Field of Search ................................ 156/173, 174, 156/175, 69, 425, 433, 523, 574, 351, 360, 361

(56) References Cited

U.S. PATENT DOCUMENTS

| | | | |
|---|---|---|---|
| 3,769,127 A | 10/1973 | Goldsworthy et al. ...... 156/172 |
| 3,970,495 A | * 7/1976 | Ashton et al. ............. 156/162 |
| 4,145,740 A | * 3/1979 | McClean et al. ............ 700/126 |
| 4,172,562 A | * 10/1979 | Smith ..................... 242/439.5 |
| 4,359,356 A | * 11/1982 | Kornbichler et al. ....... 156/175 |
| 4,558,971 A | 12/1985 | David ..................... 405/158 |
| 5,032,211 A | * 7/1991 | Shinno et al. ............. 156/361 |
| 5,335,167 A | * 8/1994 | Boyd ..................... 700/126 |
| 5,828,003 A | 10/1998 | Thomeer et al. ............ 174/69 |
| 5,921,285 A | 7/1999 | Quigley et al. ............ 138/125 |
| 5,933,945 A | 8/1999 | Thomeer et al. ............ 29/825 |
| 5,942,059 A | * 8/1999 | Wulker et al. ............. 156/64 |

* cited by examiner

Primary Examiner—Richard Crispino
Assistant Examiner—George R. Koch, III
(74) Attorney, Agent, or Firm—Osha & May L.L.P.

(57) ABSTRACT

A system and method for winding fibers onto an article is disclosed. The system includes a winding station having a controllable speed of rotation. The winding station has at least one fiber bobbin mounted on it. A rotation sensor is rotationally coupled to the winding station. The system includes a conveyor having a controllable speed and which is adapted to move the article axially through the winding station. A speed sensor, adapted to measure an axial speed of motion of the article through the winding station is positioned near the winding station. The system includes a controller adapted to operate the winding station at a rotational speed corresponding to the axial speed of motion, so as to apply the fibers to the article in a predetermined helical pattern. In one example, the helical pattern is held to a lay angle having a tolerance within one-half degree. In the method, the rotational speed of the winding station is adjusted to correspond to the axial motion of the article so that the fibers are wound in a predetermined helical pattern. In one example of the method, the lay angle of the fibers is held to within a tolerance of about one half degree. In another example, the lay angle is selected to correspond to the axial position of the article within the winding station.

15 Claims, 5 Drawing Sheets

APPARATUS AND METHOD FOR MAKING WOUND-FIBER REINFORCED ARTICLES

CROSS REFERENCE TO RELATED APPLICATIONS

This application claims to the benefit of U.S. Provisional Application No. 60/160,614, entitled "Apparatus and Method for Making Wound-Fiber Reinforced Articles," filed Oct. 20, 1999.

FIELD OF THE INVENTION

The invention is related generally to the field of wound-fiber reinforced plastic products. More specifically, the invention is related to apparatus and methods for winding fibers and applying resin to make such wound-fiber reinforced plastic products.

DESCRIPTION OF THE RELATED ART

Wound-fiber-reinforced plastic products are well known in the art. Some very useful wound-fiber reinforced plastic products include conduit or tubing used to carry fluids. This type of conduit is typically made by winding glass, graphite or other reinforcing fibers about a tube mandrel, a liner or other tube form. The fibers are wound in a substantially helical pattern. The fibers may be impregnated with resin prior to winding or the resin may be applied after winding. The resin is then cured in some manner to create the finished product.

Typical apparatus for making wound-fiber reinforced plastic products are described, for example in U.S. Pat. No. 3,769,127 issued to Goldsworthy et al. In general the apparatus known in the art for making wound-fiber products includes one or more winding stations which hold bobbins of the fibers to be wound on an article, and a conveyor for moving the article axially through the winding stations. The winding stations may rotate about the axis of the article, or the article may itself be axially rotated as it is moved through the winding stations. The axial motion of the article combined with relative rotation of the article through the winding stations results in the article having the reinforcing fibers wound in a generally helical pattern on the exterior surface of the article.

Some winding systems known in the art have a common drive system for axially moving the article, and rotating either the article or the winding stations. Relative fiber winding rotation rates can be changed, to apply different helical winding patterns, by selecting various gearing or drive belt pulley ratios between the axial rotator or winding station rotator and the axial article conveyor. Other winding systems include separate drivers for each winding station, such as an electric motor rotationally coupled to each winding station. The relative rotation rates of the winding stations in these systems are typically not controlled other than by controlling the speed of the motor. It is desirable to have a fiber winding system which has precisely controlled winding rates to form various wound-fiber reinforced plastic articles.

Prior art fiber winding systems include either a drip-type resin impregnator, an immersion bath, or a pressurized impregnator bath to apply resin to the fibers during manufacture of the reinforced product. These prior art resin impregnators can cause air pockets or inclusions in the finished resin. Inclusions can significantly weaken the final product. It is desirable to have a resin impregnator for fiber winding systems which minimizes the number of such inclusions.

Fiber winding systems known in the art typically do not actively control the amount of tension applied to the fibers during winding to account for the axial position of the article having fibers wound thereon or changes in fiber delivery characteristics during the winding operation. It is desirable to have a fiber winding system which can apply controlled tension to the fibers during winding thereof.

Wound-fiber reinforced tubing has become desirable for use in petroleum wellbores due to the cost and corrosive properties of steel, as is typically used for such tubing. Wound-fiber reinforced tubing made by methods and apparatus of the prior art typically do not have the tensile strength and differential pressure capacity for use in petroleum wellbores. It is desirable to have a system which can make wound-fiber reinforced tubing which has the requisite mechanical properties for use in petroleum wellbores.

Wound-fiber reinforced plastic is also desirable for use in pressure containers. Prior art methods for making wound-fiber reinforced plastic articles have not been particularly successful in producing pressure containers which have the requisite mechanical properties.

SUMMARY OF THE INVENTION

One aspect of the invention is a system for winding fibers onto an article. The system includes a winding station having a controllable speed of rotation. The winding station has at least one fiber bobbin mounted on it. A rotation sensor is rotationally coupled to the winding station. The system includes a conveyor which is adapted to move the article axially through the winding station. A speed sensor, adapted to measure an axial motion of the article through the winding station, is included in the system. The system includes a controller adapted to operate the winding station at a rotational speed corresponding to the measured axial motion of the article through the winding station, so as to apply the fibers to the article in a predetermined pattern.

In one embodiment, the rotational speed of the winding station is controlled to match the measured axial speed of the article. In one example of this embodiment, the rotational speed is controlled to maintain the lay angle of the fibers to within a tolerance of about one-half degree. In another embodiment, the rotational speed of the winding station is controlled so that the lay angle of the fibers corresponds to the axial position of the article within the winding station.

In a particular embodiment, the system includes a controllable brake rotationally coupled to the bobbin. The brake is selectively operable to maintain a substantially constant tension on the fibers as the fibers are wound onto the article. In one example, the tension on the fibers can be determined by measurement of the torque exerted by a motor used to turn the winding station. In one example, the torque can be determined by measuring the current drawn by the motor which rotates the winding station.

In another embodiment, the system includes a resin ring coupled to the winding station, wherein the fibers are impregnated with resin prior to winding onto the article. The resin ring in this embodiment includes a chamber sealed at its inlet and outlet by an inflatable seal. The resin is pumped into the chamber under pressure to impregnate the fibers.

Another aspect of the invention is a method for making a wound-fiber reinforced article. The method includes moving the article through a winding station at a measured rate of speed, rotating fibers around a circumference of the article at a measured rotational speed, and controlling the rotational speed to match the rate of speed at which the article moves through the winding station. In one embodiment of the method, the rotation rate of the winding station is selected to provide a fiber lay angle which is within a tolerance of about one half degree. In another embodiment of the method, the lay angle is selected with respect to an axial position of the article within the winding station.

DETAILED DESCRIPTION

Figure 1:
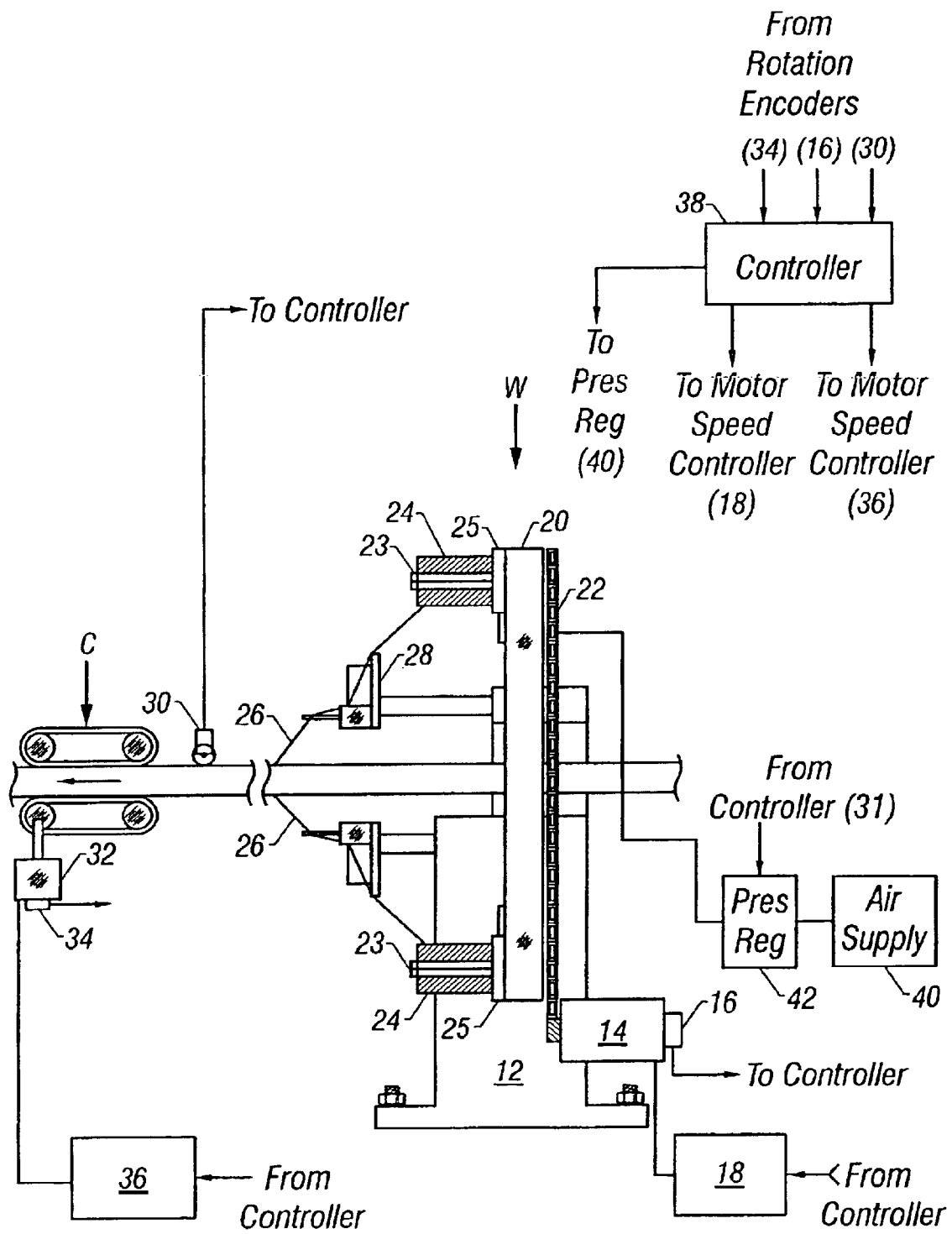
FIG. 1 shows a view of several components in one example of a fiber winding system according to the invention.

FIG. 1 shows, in general form, one example of the fiber winding part of a system for making wound-fiber reinforced plastic articles. The system includes one or more winding stations W, and a conveyor C to draw an article 10 through the system substantially axially therethrough. In this example the article 10 on which the fiber is to be wound is plastic pipe, such as thermoplastic tubing used as the liner in a continuously-made fiber reinforced plastic tubing as would be used in petroleum wellbores. It should be clearly understood, however, that the system of the invention can also be used to make discrete-length articles, including but not limited to segments of such tubing. It should also be understood that the articles having fibers wound thereon by the system of the invention need not be in the form of tubes or even have substantially cylindrical exterior surfaces. As will be further explained, articles having exterior shapes other than cylindrical tubes can be processed in the system of the invention.

The conveyor C in this example is a belt-type conveyor which pulls the article 10 axially therealong by frictional force. Any other suitable type of conveyor can also be used to draw the article 10 axially through the system. FIG. 1 shows only one winding station W for clarity of the illustration, but it is to be clearly understood that the system can include any number of such winding stations. The number of winding stations will depend on, among other things, the type of article being reinforced by the fibers wound thereon, or on the desired characteristics of the finished wound-fiber reinforced article, as is known in the art.

As the article 10 is drawn through the winding station W, in this example the winding station W rotates about the article 10 so that fibers 26 are wound onto the article in a substantially helical pattern about the exterior surface of the article 10. The fibers 26 can be made from glass, graphite or other fiber composition used to make fiber reinforced products, and are typically provided on spools or bobbins 24. The bobbins 24 are mounted on spindles 23 positioned at circumferentially spaced apart locations about a winder drum 20. The number of and positions of the spindles 23 (and bobbins 24 thereon) on the winder drum 20 are not critical to the invention, but as is known in the art, depend on factors including the numbers of fibers intended to be wound on the article 10, and any applicable size limitations on the drum 20. Such size limitations may be related to the available space in a building (not shown) in which the system is located, for example. The winder drum 20 in this example is rotatably mounted on a frame 12, which is preferably affixed to the floor surface in the building or facility in which the system is located. The winder drum 20 in this example is rotated by a first electric motor 14, the output of which is coupled to the winder drum 20 by a chain 22. The type of rotational coupling used between the first motor 14 and the winder drum 20 is not critical to the invention, but preferably the coupling provides very little rotational backlash, so that the rotational motion of the winder drum 20 very precisely corresponds to the rotational. motion of the first motor 14. The first motor 14 includes a first encoder 16 mounted thereon. The first encoder 16 generates a signal corresponding to rotational motion of its rotational input. Photoelectric encoders, Hall-effect transducers or any other similar type transducer can be used in the first encoder 16. The rotational input of the first encoder 16 is rotationally coupled to the first motor 14. The first encoder 16 generates a signal, therefore, which corresponds to the rotational position of the first motor 14, or to the rotational speed of the first motor 14. Alternatively, the first encoder 16 can be rotationally coupled to the drum 20. In the example shown in FIG. 1, the encoder 16 is rotationally coupled to the first motor 14 as a matter of convenience in mounting. Also, due to the reduction gearing between the first motor 14 and drum 20 as provided by the chain 22, such rotational coupling of the first encoder 16 provides greater accuracy in measurement of the rotational speed or position of the winder drum 20.

The signal output of the first encoder 16 is conducted to a system controller 38. The system controller 38 calculates and sends a signal, in response to the input signal from the first encoder 16, to a first motor speed controller 18. The first motor speed controller 18 is operatively coupled to the first motor 14 to control the speed of the first motor 14, as will be further explained. The system controller 38 can be a microcomputer, microprocessor or any other suitable signal processing device which can generate preselected output signals in response to sensor input signals, such as those from the first encoder 16. The manner in which the system controller 38 uses the signals from the first encoder 16 will be further explained.

The fibers 26 in this example prior to winding onto the article 10 pass through an impregnator or "resin ring" 28 coupled to the winder drum 20. The resin ring 28 will be further explained. After passing through the resin ring 28, the fibers 26 are wound around the article 10 by the rotation of the winder drum 20 with respect to the article 10. It should be clearly understood that in this aspect of the invention, the fibers 26 can be directly wound onto the article 10 without passing through the resin ring 28 as shown in FIG. 1. In this case the resin would be applied to the fiber-wound article 10 later in the manufacturing process, or a form of pre-impregnated fiber called "pre-preg" may also be used where the resin ring 28 is omitted from the system.

The linear or axial speed at which the article 10 passes through the winding station W in this example can be measured by a second encoder 30, which can include (the second encoder 30 elements not shown separately) a wheel in frictional contact with the article 10. Rotation of the wheel will correspond directly to the axial motion of the article 10. The wheel is rotationally coupled to a photoelectric sensor, Hall-effect transducer, or any other type of rotary motion encoder which generates a signal corresponding to the rotation of the wheel. The signal from the second encoder 30 is coupled to the system controller 38.

The second encoder 30 is preferably disposed proximate to the discharge side of the winding station W. The second encoder 30 can be located at any other convenient location along the system where the axial motion of the article 10 can be measured, but it should be noted that when the second encoder 30 is located further away from the winding station W, the accuracy with which the second encoder 30 signal corresponds to the axial speed of the article 10 through the winding station W will be commensurately reduced.

The conveyor C can be driven by a second electric motor 32, which in this example includes a third encoder 34 attached thereto, and a second motor speed controller 36 operatively coupled to the second motor 32. The second motor speed controller 36 obtains a control signal from the system controller 38. In operation of the system, the measurement of the axial speed made by the second encoder 30 can be used to cause the system controller 38 to generated a signal conducted to the second motor speed controller 36, whereby the speed of the second motor 32 can be adjusted to maintain a substantially constant, selected rate of axial motion of the article 10 through the system.

In operation, the system will wind the fibers 26 so that the fibers 26 traverse a substantially helical pattern about the exterior of the article 10, because the drum 20 rotates about the article 10 as the article 10 is moved axially through the winding station W by the conveyor C. The lay angle of the fibers 26 as they are so wound will depend on the rotation rate of the winder drum 20 about the article 10 as well as the rate of axial movement of the article 10 through the system. In this aspect of the invention, the rotation rate of the winder drum 20 is selected to maintain a very precise and substantially constant lay angle of the fibers 26 on the exterior of the article 10. This is performed by adjusting the rotation rate of the winder drum 20 to correspond precisely to the measured rate of axial motion of the article 10 through the system. The signal from the first encoder 16 is processed in the controller 38 along with the signal from the second encoder 30 to generate a signal for the first motor speed controller 18 which results in the appropriate rotation rate for the winder drum 20. Alternatively, the axial speed of the article 10, which is controlled by the conveyor C speed, can be adjusted to precisely correspond to a selected, constant rotational speed of the winding station W. Prior art winding systems did not have a provision to control the winding rate to correspond to measured axial motion of the article through the winding station. Variations in rate of axial motion caused by factors such as slippage in the conveyor, and axial elongation of the article, for example, resulted in inconsistent lay angle of the fibers as wound onto the article. This aspect of the invention overcomes this limitation of prior art winding systems by precisely controlling the winding rate to correspond to the axial motion rate of the article 10.

An advantageous aspect of using the second encoder 30 to measure the axial motion of the article 10 is particularly suited to where the article 10 comprises fiber reinforced tubing made in continuous form for use in petroleum wellbores. Making such continuous tubing typically requires that the conveyor C be located a substantial axial distance from the winding station W, as the typical tubing making process will include a resin curing device (not shown in FIG. 1) interposed between the winding station W and the conveyor C. The tubing is subject to some axial elongation as a result of being drawn through the system by the conveyor C, and may also become somewhat more elastic as a result of being heated in the curing device (not shown). As a result, the axial speed of the article 10 at the winding station W may not precisely correspond to the axial speed of the article 10 at the conveyor C. By measuring the axial speed of the article 10 near the winding station W and adjusting the rotational speed of the winding station W in response to the measurement of axial speed of the article 10, it has been determined that the lay angle of the fibers can be maintained to within a tolerance of about one-half degree. This angular precision was not possible using winding systems of the prior art.

Another embodiment of this aspect of the invention includes that the lay angle of the fibers 26 can be selectively changed during winding on any particular article to meet specialized mechanical requirements for the particular finished article. In one example, a length of reinforced tubing as would be used in petroleum wellbores may extend a vertical distance exceeding 10,000 feet. The vertical extent of such tubing results in the portion of the tubing located near the earth's surface supporting the weight of all the tubing below in the wellbore. It is desirable in such applications to have a tubing which has increased axial tensile strength at the "uphole" (near surface) end thereof. Increased axial strength can be attained, for example, by winding the fibers with a larger axial component of their direction in the wind pattern (lower lay angle). In a length of such tubing for use in petroleum wellbores, the lay angle of selected ones of the fibers can be continuously adjusted to become more and more parallel to the length of the tubing (decreasing lay angle) as the distance from the "downhole" end is increased. During manufacture of such a tubing according to this aspect of the invention, the second encoder 30 signal can be integrated in the system controller 38 to calculate the amount of tubing (the axial position of the tubing) pulled through the winding station W. The system controller 38 can be programmed to send a control signal to the first motor speed controller 18 which causes the first motor 14 to rotate the drum 20 more slowly as more tubing passes through the winding station W. The slowdown of rotation to decrease the lay angle in this example can be linear with respect to the amount of tubing passed through the winding station W. Slower rotation of the winding station W will result in a lay angle more parallel to the axis of the tubing. Other examples of such adjusted lay angle tubing include step-function changes in lay angle as predetermined lengths of tubing pass through the winding station W. Any other suitable selection of change in rotation rate, and consequently the lay angle, with respect to axial motion or position of the article 10 can be accommodated by the system according to this aspect of the invention, by appropriate programming of the system controller 38. Another example of this aspect of the invention for making wound-fiber reinforced plastic articles having specialized exterior shapes will be further explained. It should also be noted that the axial position of the article 10 can be determined by other means, such as proximity sensors, as will be further explained.

Another aspect of the invention is maintaining selected tension on the fibers 26 as they are wound onto the article 10. Particularly for such applications as petroleum wellbore tubing, it has been determined that maintaining selected tension on the fibers 26 during winding thereof can improve the performance of the finished wound-fiber reinforced article. In this example, each of the spindles 23 includes a brake 25 which retards rotation of the bobbin 24 mounted on the particular spindle 23. In this example, the brake is an air brake coupled to an air supply 40 through a pressure regulator 42. The pressure regulator 42 provides selected operating pressure to the brake 25. The operating pressure magnitude is related to a control signal provided by the system controller 38. Other types of brake, such as electromagnetic brakes or hydraulic brakes can be used in this aspect of the invention. The force applied by the brakes 25 in response to the control signal from the system controller 38 will cause the bobbin 24 to resist rotation, as the fibers 26 are pulled off the bobbin 24, to the extent of the braking force exerted by the brake 25. This results in tension being applied to the fibers 26 which is related to the amount of braking force. The amount of tension can be controlled by measuring the tension on the fibers 26, such as by a probe which measures deflection of the fibers 26 on application of a known force applied thereto, or by other convenient measurement which corresponds to the tension on the fibers 26. One such corresponding measurement is the torque exerted by the first motor 14. The torque can be measured by a torque sensor (not shown) rotationally coupled to the first motor 14, or alternatively can be calculated in the system controller 38 from measurement of the current drawn by the first motor 14. During operation of the system, the brake 25 force is adjusted, by the output signal from the system controller 38, so that the tension on the fibers 26 is maintained at a preselected value. The preselected value can be maintained irrespective of the rotational speed of the winder drum 20 by controlling the braking force on the spindles 23. It is clearly within the contemplation of this invention that the tension on the fibers 26 can be varied during fiber winding on any particular article 10 to suit the needs of the particular article. Prior art winding Systems included a fixed friction brake on the spindles. Among other limitations of fixed-friction brakes, the tension on the fibers changes as the fibers are drawn off the bobbins and the diameter of the bobbins changes. Tension on the fibers will also change with respect to the winding speed (or drum rotation speed) using fixed-friction spindle brakes as in the prior art.

Another aspect of the invention concerns detection and reduction of undesirable components of motion in the rotation of the winder drum 20. The source of some of these undesirable components is torsional oscillation which can be explained as follows. The fibers 26 traverse a radial distance between the location on the winder drum 20 of the spindles 23 and the exterior surface of the article 10. The tension on the fibers 26 during the winding process results in the mechanical equivalent of a torsional spring between the winder drum 20 and the article 10, the equivalent spring constant of which is related to, among other things, the number of, and elastic properties of, the fibers 26, the radial distance traversed by the fibers 26 and the mass of the winder drum 20. It has been determined that the fiber winding process is enhanced by operating the winder drum 20 at a rotational speed which does not cause torsional resonant excitation of the winder drum/fiber system. The resonant excitation can be determined by measurement of the first motor 14 current draw or from the rotary position signal from the first encoder 16. Presence of oscillations (non-DC components at about the torsional resonant frequency) in the amount of current drawn by the first motor 14 are indicative of torsional resonance. Preferably, the system controller 38 is programmed to change the speeds of the second 32 motor to move the article 10 at a different axial speed, and correspondingly the first 14 motor to wind the fibers 26 at the correct rate, when such torsional resonance is detected. It is also possible to detect torsional resonance in the motion of the winder drum 20 by analysis of the signal from the first encoder 16. The signal from the first encoder 16 will generally include a rotational speed component which corresponds to the base rotational speed of the winder drum 20. If torsional resonance is present, spectral analysis Of the rotational motion of the winder drum 20 can include a speed component at the torsional resonant frequency.

Similarly, the signal from the second encoder 30 can also be spectrally analyzed to determine the presence of undesirable axial oscillations in the motion of the article 10 through the winding system. It will be appreciated that various factors such as the elastic properties of the article 10, the axial span between the winding station W and the conveyor C, and the axial tension applied by the conveyor C as it pulls the article 10 through the system will provide that the article 10 will have a resonant frequency of axial elongation. The system controller 38 can be programmed to adjust the speed of the second motor 32, thereby to adjust the speed of the conveyor C where axial elongation resonance components are detected in the motion of the article 10 as measured by the second encoder 30.

Figure 2:
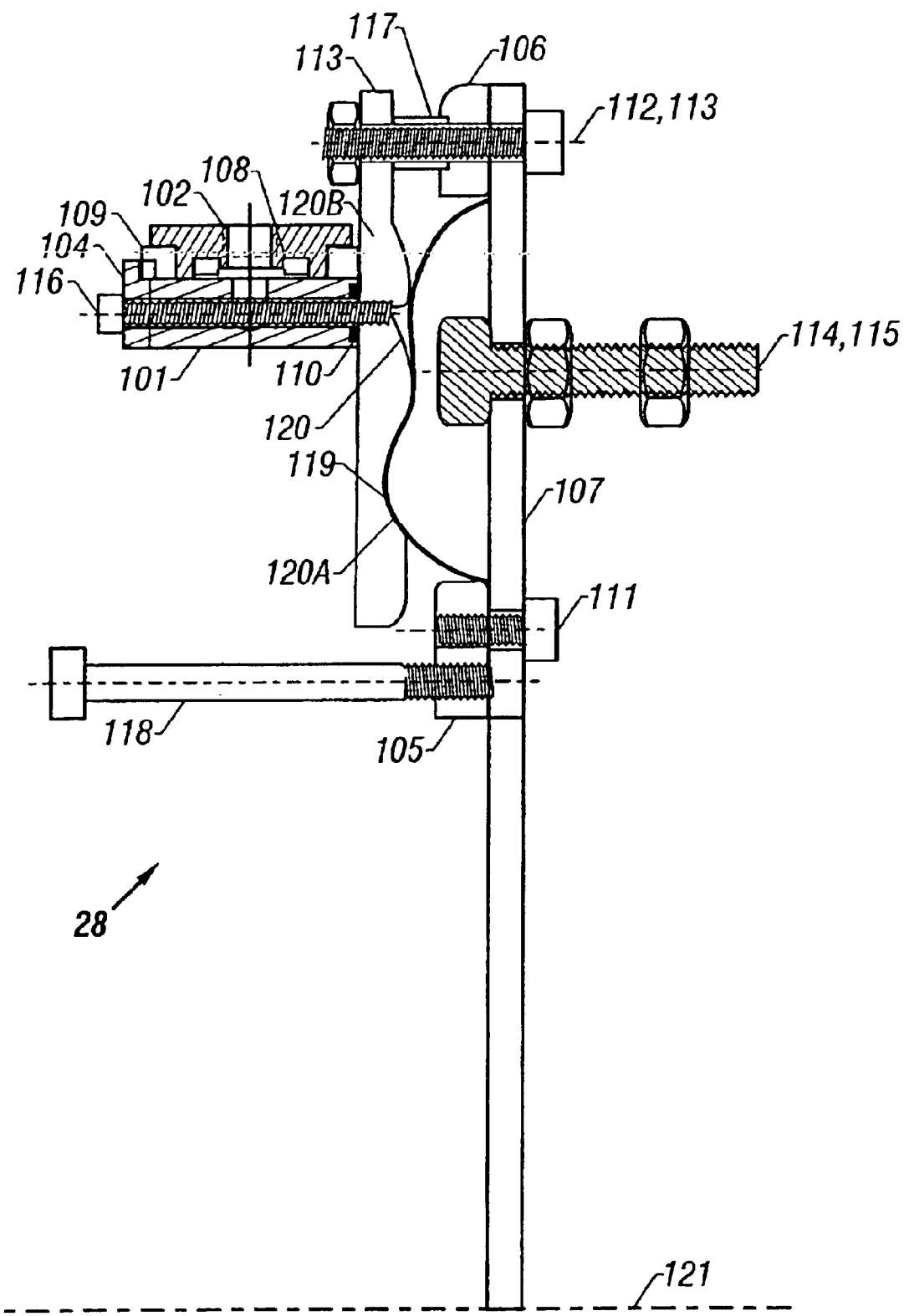
FIG. 2 shows one example of a resin ring used to impregnate fibers in the system of the invention.

As previously explained, this embodiment of the invention can include a resin ring 28 to impregnate the fibers 26 prior to winding on the article 10. One aspect of this invention includes novel features on the resin ring 28 which improve the application of resin to the fibers 26. FIG. 2 shows one embodiment of the resin ring 28 in more detail. The drawing in FIG. 2 only shows the components on one side of the centerline 121 of the ring 28. Since the ring 28 is substantially circular, the drawing in FIG. 2 should be considered as rotationally symmetric about the centerline 121, wherein the elements identified in FIG. 2 will also be present at the same radial distances on the other side of the centerline 121, as well as about the entire circumference of the ring 28. A base plate 107 forms the structural backbone of the ring 28, and is mounted at an axially spaced apart location from the drum (20 in FIG. 1). The base plate 107 is coupled to the drum so that it rotates along with the drum (20 in FIG. 1). A chamber cover 103 is mounted to the base plate 107 at an axially spaced apart position from the base plate 107, using convenient mounting apparatus such as bolts 112, nuts 113 and spacers 117. The spacers 117 can also perform as a first winding guide surface for the fibers (26 in FIG. 1) to turn the plane of the fiber "tows" as they are unwound from the bobbins (24 in FIG. 1) to conform to the interior of the resin ring 28. The interior surface of the chamber cover 103 is shaped to form, within the space between the cover 103 and the base plate 107, one side of a resin application chamber 120. The internal shape of the other side of the chamber 120 is formed in this example by an inflatable bladder-type seal 119 which is inflated, with air in this example, to fill the space between the base plate 107 and the chamber cover 103. Preferably the interior surface of the cover 103 includes formed surfaces 120A, 120B which bound the radially internal and external limits of the chamber 120 and cause the fibers (26 in FIG. 1) to change their direction of travel as they pass through the chamber 120. The formed surfaces 120A, 120B also help to seal the chamber 120 on its radially innermost and outermost limits. Air to inflate the seal 119 can be supplied through a hollow bolt 114 and nut 115 affixed to the base plate 107 and sealed thereto. The air can come from the air supply (40 in FIG. 1) or other pressure supply. Alternatively the seal 119 can be inflated hydraulically.

Resin is pumped into a passage 102 through a hollow, sealed bolt 116 into the chamber 120. The passage 102 is formed into a rotationally fixed ring mounted on one side of a bearing 108 which is externally sealed by seals 109. The other side of the bearing 108 can be coupled to the base plate 107 through the chamber cover 103 by coupling it to a mounting bracket 104 or the like. The purpose of the bearing 108 and seals 109 is to enable resin to be pumped in under pressure to the chamber 120 from a rotationally fixed source, while reducing the amount of resin which leaks out of the chamber. Prior art resin rings typically applied the resin by gravity in at atmospheric pressure, where the point of application was substantially not sealed. As the fibers (26 in FIG. 1) pass through the chamber 120, resin is forced into the fibers 26 under pressure. As the fibers are drawn out of the chamber 120 they pass between one of the formed surfaces 120A and the seal 119. The wiping action of the seal 119 as the fibers 26 leave the chamber 120 can improve the penetration of the resin through the strands of the fiber "tows". As the fibers 26 are drawn out of the chamber 120, they pass over guide pins 118 where the planes of the fiber tows are turned to be substantially parallel to the exterior surface of the article (10 in FIG. 1). The guide pins 118 can be mounted to the base plate 107 by a mounting ring 105 coupled to the plate 107 by bolts 111.

In operation, the pressure applied to the seal 119, and the resin pressure are adjusted so that the very little or no resin leaks out of the chamber 120, while maintaining as low a friction as practical between the fiber 26 and the chamber 120, and that the fibers 26 are fully impregnated with resin. The resin used in this invention can be thermoset resin known in the art, or any other resin convenient for the manufacture of wound-fiber reinforced plastic articles. An advantageous aspect of the resin ring 28 shown in FIG. 2 is that is provides good impregnation of the fibers 26 with resin, while minimizing resin losses due to leakage.

Figure 3:
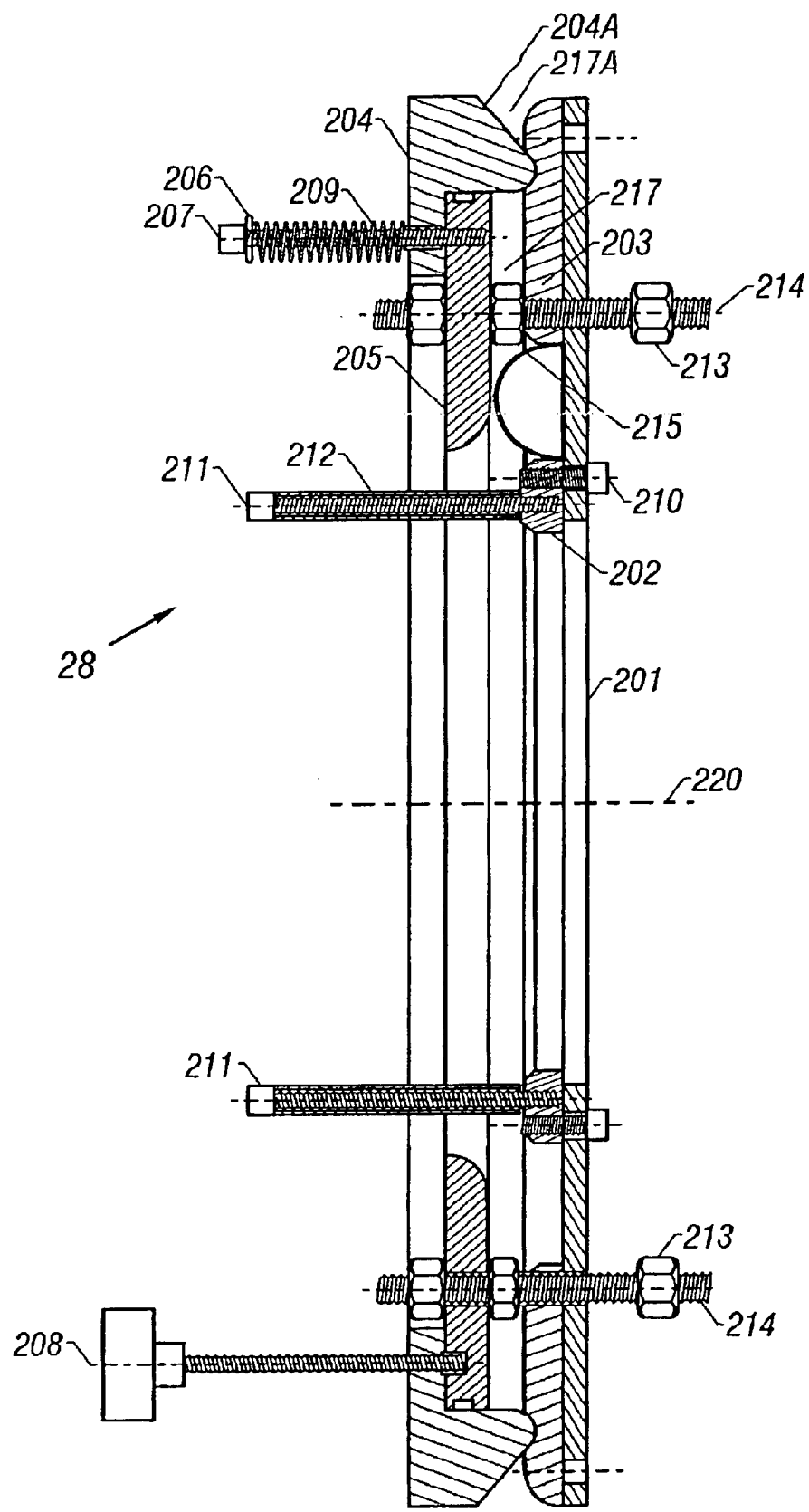
FIG. 3 shows an alternative embodiment of the resin ring shown in FIG. 2.

An alternative embodiment of the resin ring 28 is shown in FIG. 3. As for the ring shown in FIG. 2, the resin ring 28 shown in FIG. 3 is symmetric about the centerline 220. The resin ring 28 in FIG. 3 is coupled to the winder drum (20 in FIG. 1 by a base plate 201. The base plate 201 can be coupled to the winder drum (20 in FIG. 1) by bolts 214 having spacer nuts 213 threaded thereon, to be able to adjust the axial position of the resin ring 28. The base plate 201 includes circumferentially spaced apart guide pins 211 to change the planar lay of the fiber tows as they exit the resin ring 28 to be wound onto the surface of the article (10 in FIG. 1). The guide pins 211 can be coupled to the base plate 201 by a mounting ring 202 which can be coupled to the base plate 201 by bolts 210. A cover plate 204 can be coupled to the base plate 201 axially spaced apart from the base plate 201 by spacers 215 to form an annular resin chamber 217. Resin is conducted into the upper part of the chamber 217 by gravity. The inner surface 204A of the cover plate 204 is formed to create a tapered opening 217A between the cover plate 204 and the base plate 201 through which the fibers (26 in, FIG. 1) are conducted from the bobbins (24 in FIG. 1). The chamber 217 is bounded at its radially innermost part by a guide plate 205 disposed between the cover plate 204 and the base plate 201 inside the chamber 217. Remaining annular space between the guide plate 205 and the base plate 201 can be filed with an elastomeric seal 215, which in this example is inflatable. The radially innermost surface of the guide plate 205 is formed to turn the fiber 26 as it leaves the chamber 217. The seal 215 reduces the amount of resin which leaks out of the chamber 217 and compresses the resin into the strands of the fiber tow. As the fibers leave the chamber 217 they are passed over the guide pins 211 before being wound onto the article 10. The cover plate 204 can be coupled to the base plate 201 by spring-loaded bolts 206, 207. In one example, the spring tension can be adjusted by thumbwheels 208 or the like so that the rate of resin feed into the chamber 217, and the amount of drag on the fibers 26, can be matched to the particular type and size of fiber.

Another aspect of the invention concerns a method for method for making wound-fiber reinforced articles, where the article is formed from a compressible material. This aspect of the invention is particularly important where the article is thermoplastic or elastomer liner for a fiber composite tube. Both thermoplastic and elastomer are subject to compression when the fibers are wound thereon under tension. In the case of tubing, the thermoplastic or elastomer liner can become eccentric (out of round) when the fibers are wound under tension. If the liner, and consequently the fiber reinforced composite pipe therefrom is not substantially round, the resulting pipe will be particularly susceptible to crush under bending loads or external pressure, and may have reduced resistance to burst under internal pressure. It has been determined that the cross-sectional shape of the article (10 in FIG. 1) can be better maintained by pressurizing the interior of the article 10 during the winding and resin curing process. Any convenient means for pressurizing the interior of the article 10 can be used, including inserting a plug into one end and coupling the other end to the air supply (40 in FIG. 1) or other pressure source. The pressure source can also be an hydraulic pressure source.

Figure 4:
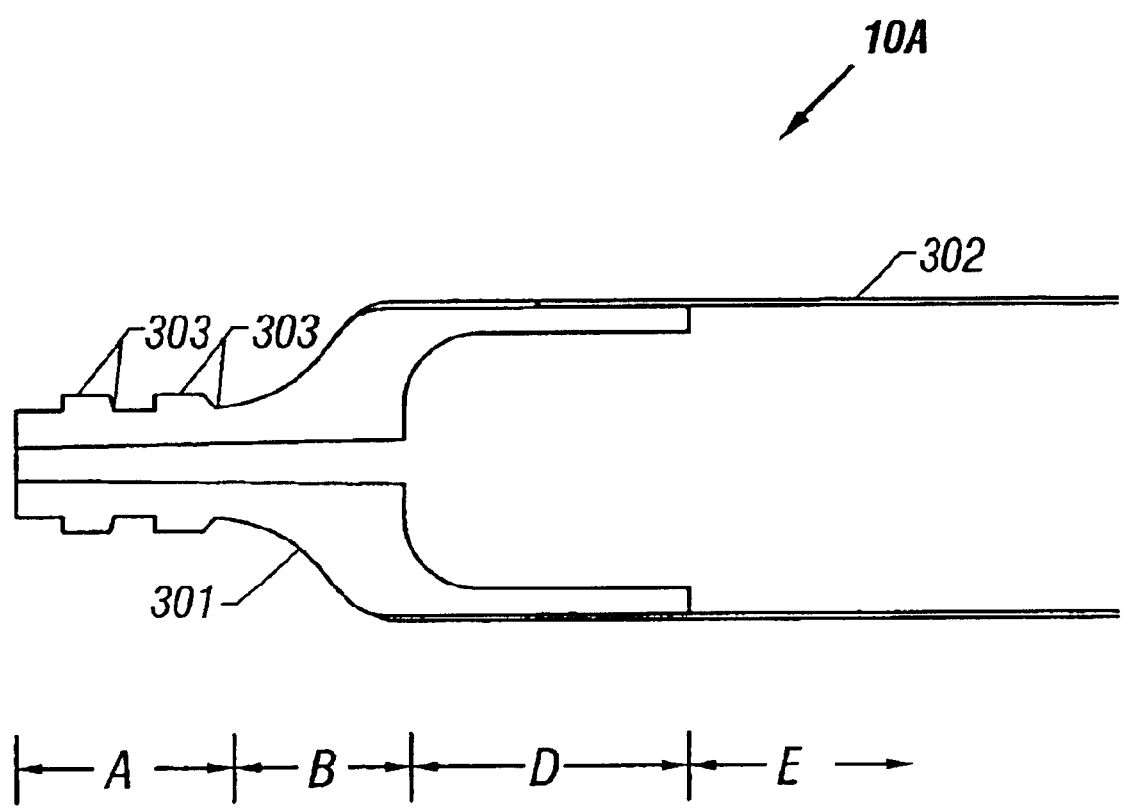
FIG. 4 shows a specialized fiber reinforced product which can be made using the system of the invention.

In another aspect of the invention, the system can be used to economically make specialized shape wound-fiber reinforced products. FIG. 4 shows one end of a pressurized fluid container which can be made using the system of the invention. The container 10A includes a liner 302 which can be thermoplastic, elastomer, or other fluid-impermeable material. An end connector 301 is inserted into the open end of the liner 302. The connector 301 is typically made from steel or other pressure-resistant metal and includes a passage 304 therethrough so that fluid may be put into and removed from the container 10A. The assembled liner 302 and end connector 301 are put into the winding system as in FIG. 1. The small diameter end of the connector 301 includes a series of fiber traps 303 which engage the wound fibers and transfer axial load thereto so that the connector 301 will not disengage from the fibers wound thereon. In making the container 10A, the fibers are preferably wound under very high tension over the traps 303. As previously explained, the tension on the fibers can be changed by changing the force exerted by the spindle brakes (25 in FIG. 1). The system controller (38 in FIG. 1) can be programmed to cause the brakes 25 to apply high force as the traps 303 pass through the winding station (W in FIG. 1). The axial span for which the very high tension is needed is marked at A in FIG. 4. As the fibers are wound over the tapered portion of the connector 302, less tension is required, but the lay angle of the fibers is preferably decreased to avoid miswinding and crush of the fiber tows. This axial span is shown at B in FIG. 4. As previously explained, the lay angle of the fibers can be decreased by decreasing the rotational speed of the drum (20 in FIG. 1) or by increasing the speed of the conveyor (C in FIG. 1). The system controller 38 can be programmed to increase the conveyor C speed or decrease the winder drum 20 speed when winding fibers over interval B. The axial position of the container 10A as it passes through the winding system can be determined by integrating measurements from the second encoder (30 in FIG. 1). Other methods for determining the axial position of the container 10A will be further explained.

Where the liner 302 is assembled to the connector 301, it is preferable that the lay angle be increased to add radial strength to the joint between the connector 301 and liner 302. The interval requiring the reduced fiber lay angle is shown at D in FIG. 4. As previously explained, the fiber lay angle can be increased by increasing the rotation rate of the drum 20 or by decreasing the speed of the conveyor C. The system controller 38 can be programmed to make the appropriate speed changed over interval D. The remaining portion of the container 10A, interval E in FIG. 4, has substantially uniform pressure resistance and axial strength characteristics. The system controller 38 can be programmed to make the conveyor C and drum 20 operate at speeds which provide appropriate fiber lay angles over interval E. The opposite end (not shown) of the container 10A can include a connector similar to that shown in FIG. 4, or may include any other type of end closure which can be sealed and held in place by fiber wrapping. As is the case for fiber reinforced tube manufacture explained previously herein, it is preferable that the interior of any liner 302 used in making the container 10A be internally pressurized during fiber winding and resin cure.

Alternatively, to integrating the measurements from the second encoder (30 in FIG. 2) the axial position of the article 10 can be determined using a proximity sensor (not shown) including capacitive, gamma radiation transmission or magnetic types, mounted in a convenient location such as on the second encoder (30 in FIG. 1). The proximity sensor (not shown) can be used to detect when the connector 301 is near it, so that the appropriate changes in the fiber lay angle and/or winding tension can be made. Magnetic or gamma radiation transmission type proximity sensors are quite suitable when the connector 301 is formed from steel. Capacitive sensors may be particularly suitable where the connector 301 is formed from a material having a substantially different dielectric constant than the remainder of the article 10. It is also within the contemplation of this aspect of the invention that the second encoder (30 in FIG. 1) or any other suitably located sensor can make a measurement corresponding to the outside diameter, at any axial position, of the article 10. Such measurements are particularly suitable where the article, such as connector 301 has a unique diameter profile along its axial length, whereby an axial position of the article can be identified by the diameter of the article at any axial position. Such measurements of the outside diameter of the article, such as the connector 301, can be used to control the rotational speed of the winding station (W in FIG. 1) so that the fiber lay angle will appropriately correspond to the outside diameter of the article, or the axial position of the article.

Figure 5:
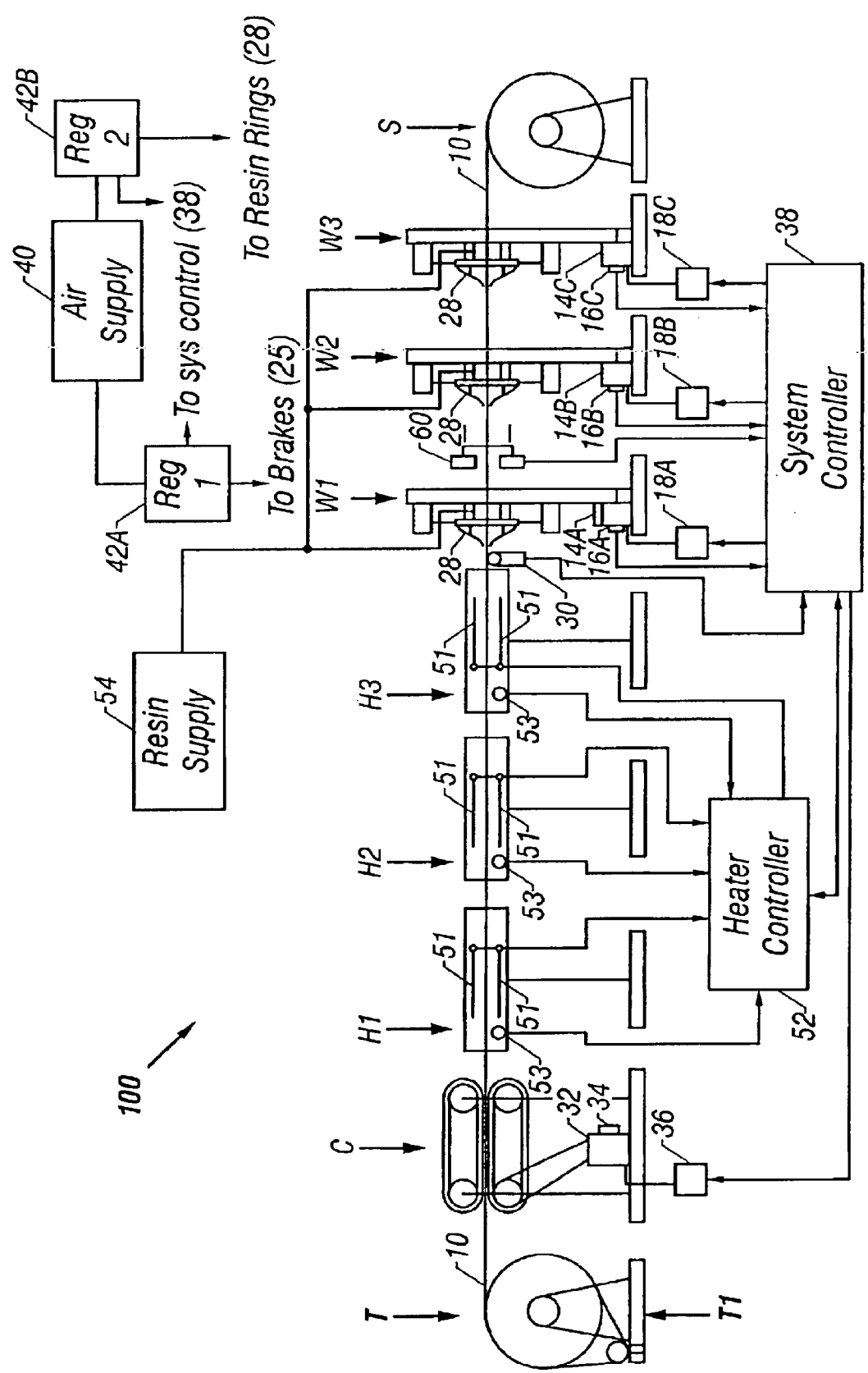
FIG. 5 shows an overall view of another example of a fiber winding system according to the invention.

FIG. 5 shows a general overview of one embodiment of a system for making wound-fiber reinforced products which incorporates other aspects of the invention. The system 100 in this example makes continuous lengths of fiber reinforced tubing, but the system 100 can be readily adapted to make other types of fiber reinforced products. The article 10 to be reinforced in the example of FIG. 5 is elastomer or thermoplastic liner which is supplied from a supply spool S. As the article 10 is pulled through the system by the previously described conveyor C, it is drawn from the supply spool S. As previously explained, the article 10 is drawn through winding stations, three of which W1, W2 and W3 are shown in FIG. 5. Each of the winding stations W1, W2, W3 has its own first motor 14A, 14B, 14C, respectively to drive the winding station, and as previously explained, each such motor has a corresponding first encoder 16A, 16B, 16C and first motor speed controller. 18A, 18B, 18C. The rotational speeds of each winding station W1, W2, W3 are adjusted as explained previously. The air supply 40 is connected to a first regulator 42A, which receives a control signal from the system controller 38 to selectively inflate the seals in the resin rings 28. The air supply 40 is also connected to a second regulator 42B, which receives a control signal from the system controller 38 to govern the operation of the spindle brakes (25 in FIG. 1) as previously explained. A resin supply 54 directs resin under appropriate pressure to each of the resin rings 28. The resin in this example is a thermoset resin, which is cured by heating to a predetermined temperature. After leaving the winding stations W1, W2, W3, the article 10 is drawn through curing stations H1, H2, H3. The curing stations H1, H2, H3 in this example include electric resistance heaters 51, which are controlled by a heater controller 52 in response to the output of infrared sensors 53. Other types of curing stations will work with this invention, depending on the type of resin used, and include, for example, ultraviolet, infrared, microwave, radio frequency and electron beam, among others. The type of curing station is not meant to limit the invention.

Another type of heater which can be used when the article 10 includes a conductive mandrel instead of non-conductive material (such as thermoplastic or elastomer) is an electromagnetic induction heater. If for example, the article 10 includes lengths of steel tubing as a mandrel, the article 10 can be cured from the inside out by inductively heating the mandrel. In this case the heaters 51 can comprise wire coils or other forms of antennas through which radio frequency (RF) power is passed to cause the mandrel to heat up. The inductive heater can be combined with the previously described resistance heater to cure the resin both from the outside and the inside.

The conveyor C, including the second motor 34, third encoder 34 and second speed controller 36 are substantially the same as previously explained. In this example, where the article 10 is continuously made tubing, the finished product can be stored on a take-up reel such as shown at T. While the take up reel T would typically have its own motor T1 to rotate it, the axial motion of the article 10 through the system 100 is more commonly controlled by the conveyor C.

Another aspect of the invention is illustrated in FIG. 5. The system 100 in this aspect of the invention includes a diameter measuring sensor 60, which can be any type capable of making very precise measurements of the outside diameter of the article 10 as is passes through the system 100. The exact placement of the diameter sensor 60 is not critical to the invention, by preferably is placed on the downstream side of at least one of the winding stations such as W2. The purpose of the diameter sensor 60 is to provide the system controller 38 with a signal corresponding to the outside diameter of the article 10 after some of the fibers have been wound thereon. The controller 38 in this aspect of the invention is programmed to adjust one of the lay angle of the fibers as applied by the subsequent winding stations (W1 in FIG. 5 for example), or the tension on the fibers as applied by the subsequent winding stations (W1 in FIG. 5 for example). The adjustment in the lay angle and/or the fiber tension is intended to provide adjustment for small variations in the external diameter of the wound fibers, so that the finished article has as uniform as possible an external diameter. Maintaining the external diameter of the finished article can be performed, for example, by increasing the lay angle as applied by the subsequent winding stations where the sensor 60 detects an increase in external diameter of the fibers as applied by the previous winding stations (W2, W3 in FIG. 5 for example). Increasing the lay angle, as previously explained, can be performed by increasing the rotation rate of the winder drums in the subsequent winding stations (W1 for example). The increased lay angle of the fibers will result in a decrease in the thickness of the fibers as applied.

Alternatively, the tension on the fibers can be increased by increasing the braking force. Increasing the tension on the fibers as they are wound will increase the amount of lateral spreading of the individual fiber tows, thereby decreasing the thickness of the fiber as wound.

Those skilled in the art will appreciate that other embodiments of the invention can be devised which do not depart from the spirit of the invention as disclosed herein. Accordingly, the invention shall be limited in scope only by the attached claims.

What is claimed is:

1. A system for winding fibers onto an article, comprising:
   a winding station having at least one fiber bobbin thereon;
   a conveyor adapted to move said article axially through said winding station; and
   a resin ring coupled to said winding station wherein said fibers are impregnated with resin prior to winding onto said article, said resin ring comprising a chamber sealed by an inflatable seal disposed where said fibers enter and leave said chamber, a rotationally fixed inlet for said resin, and formed surfaces disposed inside said chamber to change a direction of travel of said fiber therethrough.

2. The system as defined in claim 1 wherein said resin is pumped into said chamber under pressure through said rotationally fixed inlet.

3. The system as defined in claim 1 further comprising a pressure source arranged to charge an interior of said article, so that a cross-sectional shape of said article is substantially maintained during winding said fibers on said article.

4. The system as defined in claim 1 further comprising an axial resonance detector adapted to detect resonance in axial motion of said article through said system, said axial resonance detector and said conveyor coupled to a controller, said controller adapted to adjust an axial speed of motion of said article when axial resonance is detected.

5. The system as defined in claim 4 wherein said axial resonance detector comprises an axial motion sensor operatively coupled to said article as it passes through said system.

6. A system for winding fibers onto an article, comprising:
   a winding station having a controllable speed of rotation, said winding station having at least one fiber bobbin thereon;
   a conveyor adapted to move said article axially through said winding station;
   a sensor adapted to measure axial speed of said article proximate to said winding station, said axial speed sensor comprising a wheel in frictional contact with said article coupled to a rotary encoder;
   a sensor adapted to measure said speed of rotation of said winding station, said rotational speed sensor comprising a rotary encoder rotationally coupled to a motor adapted to rotate said winding station;
   a controller adapted to adjust said speed of rotation of said winding station in response to output of said sensor adapted to measure said speed of rotation, said rotation speed sensor and said axial speed sensor operatively coupled to said controller, said adjustment to cause correspondence of said rotational speed with said measured axial speed to wind said fibers on said article in a helical pattern having a lay angle tolerance of about one-half degree;
   a resin ring coupled to said winding station adapted to apply resin to said fibers prior to winding on said article, said resin ring comprising a rotationally fixed inlet for said resin, an inflatable seal adapted to seal a fiber inlet and a fiber outlet of a chamber wherein said resin is applied to said fibers, said chamber having formed surfaces therein so that said fibers change directed as they pass through said chamber;
   a controllable force brake rotationally coupled to said bobbin, said brake selectively operable to maintain a substantially constant tension on said fibers as said fibers are wound onto said article; and
   a detector adapted to detect torsional resonance in said winding station coupled to said controller, said controller adapted to adjust said rotational speed of said winding station and said speed of axial motion of said article to avoid said torsional resonance.

7. The system as defined in claim 6 wherein said controller is adapted to adjust said speed of rotation to provide a lay angle of said fibers corresponding to an axial position of said article within said winding station.

8. The system as defined in claim 7 further comprising an integrator coupled to said axial speed sensor, said integrator adapted to generate a signal corresponding to said axial position.

9. The system as defined in claim 7 further comprising a proximity sensor for generating a signal corresponding to said axial position of said article.

10. The system as defined in claim 9 wherein said proximity sensor comprises a magnetic sensor.

11. The system as defined in claim 6 wherein said controllable force brake comprises a magnetic brake.

12. The system as defined in claim 6 wherein said resin is pumped into said chamber under pressure through said rotationally fixed inlet.

13. The system as defined in claim 1 wherein said torsional resonance detector comprises a current measuring circuit coupled to a motor adapted to rotate said winding station.

14. The system as defined in claim 1 further comprising an axial resonance detector adapted to detect resonance in axial motion of said article, said axial resonance detector coupled to said controller, said controller adapted to adjust at least one of said speed of rotation and a speed of axial motion when axial resonance is detected by said axial resonance detector.

15. The system as defined in claim 14 wherein said axial resonance detector comprises said axial motion sensor.

* * * * *